(12) United States Patent
Nerius et al.

(10) Patent No.: US 11,442,899 B2
(45) Date of Patent: Sep. 13, 2022

(54) SYSTEMS AND METHODS FOR IMPROVED APPLICATION PROGRAMING INTERFACE (API) RETRY HANDLING

(71) Applicant: ServiceNow, Inc., Santa Clara, CA (US)

(72) Inventors: Joshua Timothy Nerius, Chicago, IL (US); Venkata Kiran Kumar Koya, Poway, CA (US)

(73) Assignee: ServiceNow, Inc., Santa Clara, CA (US)

( * ) Notice: Subject to any disclaimer, the term of this patent is extended or adjusted under 35 U.S.C. 154(b) by 277 days.

(21) Appl. No.: 16/370,306

(22) Filed: Mar. 29, 2019

(65) Prior Publication Data
US 2020/0301607 A1  Sep. 24, 2020

Related U.S. Application Data

(60) Provisional application No. 62/820,712, filed on Mar. 19, 2019.

(51) Int. Cl.
*G06F 16/17* (2019.01)

(52) U.S. Cl.
CPC .............................. *G06F 16/1734* (2019.01)

(58) Field of Classification Search
CPC ...... G06F 3/0659; G06F 3/0604; G06F 9/543; G06F 3/0673; G06F 11/1402; G06F 8/10; G06F 16/2358; G06F 16/2291; G06F 16/1734; G06F 11/1443; G06Q 10/067; G06Q 10/063
See application file for complete search history.

(56) References Cited

U.S. PATENT DOCUMENTS

| | | |
|---|---|---|
| 6,609,122 B1 | 8/2003 | Ensor |
| 6,678,887 B1 | 1/2004 | Hallman |
| 6,684,385 B1 * | 1/2004 | Bailey .................. G06F 8/34 717/105 |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |

(Continued)

*Primary Examiner* — Mariela Reyes
*Assistant Examiner* — Fatima P Mina
(74) *Attorney, Agent, or Firm* — Fletcher Yoder PC

(57) ABSTRACT

A computing system includes a server. The server is communicatively coupled to a data repository and is configured to store a data in the data repository. The server is further configured to create, via a visual information flow creation tool, at least one information flow object. The server is additionally configured to create, via a retry handling policy system, a retry policy, wherein the retry policy comprises a retry condition and a retry strategy, and to enable the at least one information flow object to follow the retry strategy when the retry condition occurs.

20 Claims, 11 Drawing Sheets

(56) References Cited

U.S. PATENT DOCUMENTS

| | | | | |
|---|---|---|---|---|
| 7,925,981 | B2 | 4/2011 | Pourheidari | |
| 7,930,396 | B2 | 4/2011 | Trinon | |
| 7,945,860 | B2 | 5/2011 | Vambenepe | |
| 7,966,398 | B2 | 6/2011 | Wiles | |
| 8,051,164 | B2 | 11/2011 | Peuter | |
| 8,224,683 | B2 | 7/2012 | Manos | |
| 8,266,096 | B2 | 9/2012 | Navarrete | |
| 8,402,127 | B2 | 3/2013 | Solin | |
| 8,457,928 | B2 | 6/2013 | Scarpelli | |
| 8,478,569 | B2 | 7/2013 | Scarpelli | |
| 8,612,408 | B2 | 12/2013 | Trinon | |
| 8,615,562 | B1 * | 12/2013 | Huang | H04L 63/20 709/217 |
| 8,674,992 | B2 | 3/2014 | Poston | |
| 8,689,241 | B2 | 4/2014 | Naik | |
| 8,743,121 | B2 | 6/2014 | De Peuter | |
| 8,832,652 | B2 | 9/2014 | Mueller | |
| 8,887,133 | B2 | 11/2014 | Behnia | |
| 9,065,783 | B2 | 6/2015 | Ding | |
| 9,098,322 | B2 | 8/2015 | Apte | |
| 9,122,552 | B2 | 9/2015 | Whitney | |
| 9,239,857 | B2 | 1/2016 | Trinon | |
| 9,317,327 | B2 | 4/2016 | Apte | |
| 9,363,252 | B2 | 6/2016 | Mueller | |
| 9,535,737 | B2 | 1/2017 | Joy | |
| 9,557,969 | B2 | 1/2017 | Sharma | |
| 9,645,833 | B2 | 5/2017 | Mueller | |
| 9,654,473 | B2 | 5/2017 | Miller | |
| 9,766,935 | B2 | 9/2017 | Kelkar | |
| 9,792,387 | B2 | 10/2017 | George | |
| 9,805,322 | B2 | 10/2017 | Kelkar | |
| 2006/0224959 | A1 * | 10/2006 | McGuire | G06F 40/18 715/700 |
| 2009/0106255 | A1 * | 4/2009 | Lacapra | G06F 11/1076 |
| 2011/0093937 | A1 * | 4/2011 | Mantle | G06F 21/6218 726/6 |
| 2012/0281825 | A1 * | 11/2012 | Segall | H04M 3/5141 379/265.1 |
| 2015/0072691 | A1 * | 3/2015 | Shaw | H04W 36/22 455/437 |
| 2018/0103500 | A1 * | 4/2018 | Chiang | H04L 65/1016 |
| 2018/0131470 | A1 * | 5/2018 | Padmanabhan | G06F 3/0619 |
| 2018/0218295 | A1 * | 8/2018 | Hasija | G06F 8/10 |

* cited by examiner

SYSTEMS AND METHODS FOR IMPROVED APPLICATION PROGRAMING INTERFACE (API) RETRY HANDLING

CROSS REFERENCE TO RELATED APPLICATION

This application claims priority to and benefit of U.S. Provisional Patent Application No. 62/820,712, entitled "SYSTEMS AND METHODS FOR IMPROVED APPLICATION PROGRAMMING INTERFACE (API) RETRY HANDLING", filed Mar. 19, 2019, which is herein incorporated by reference in its entirety for all purposes.

BACKGROUND

The present disclosure relates generally to application programming interfaces (APIs), and more specifically to API retry handling.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing-based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Within the context of cloud computing solutions for data repositories, users may be asked to deal with ever increasing amounts of data, e.g., including certain date-based information stored in the data repositories. In fact, the amount of cloud-based and date-based data collected and stored in today's cloud computing solutions, such as cloud-based repositories, may be orders of magnitude greater than what was historically collected and stored. Users tasked with automating and/or troubleshooting enterprise, IT, and/or other organization-related functions (e.g., incident tracking and/or help desk-related functions) navigate ever increasing amounts of date-based data to properly and efficiently perform their job functions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing amounts of data representing vast resources become available, it becomes increasingly difficult to analyze the data, interact with the data, and/or provide reports for the data. The current embodiments enable systems and methods that may create a custom retry mechanisms (e.g., custom retry policies) for use when interacting with third party systems. The retry mechanisms may include custom error handling in certain systems that provide for visual, natural language-based development of automated processes. For example, a Flow Designer system may include a flowchart-like development approach in lieu of typing in computer code. In certain embodiments, the Flow Designer system may include visual tools to create the custom retry mechanism to handle a variety of error conditions, thus improving the resultant automated processes developed via the Flow Designer system.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
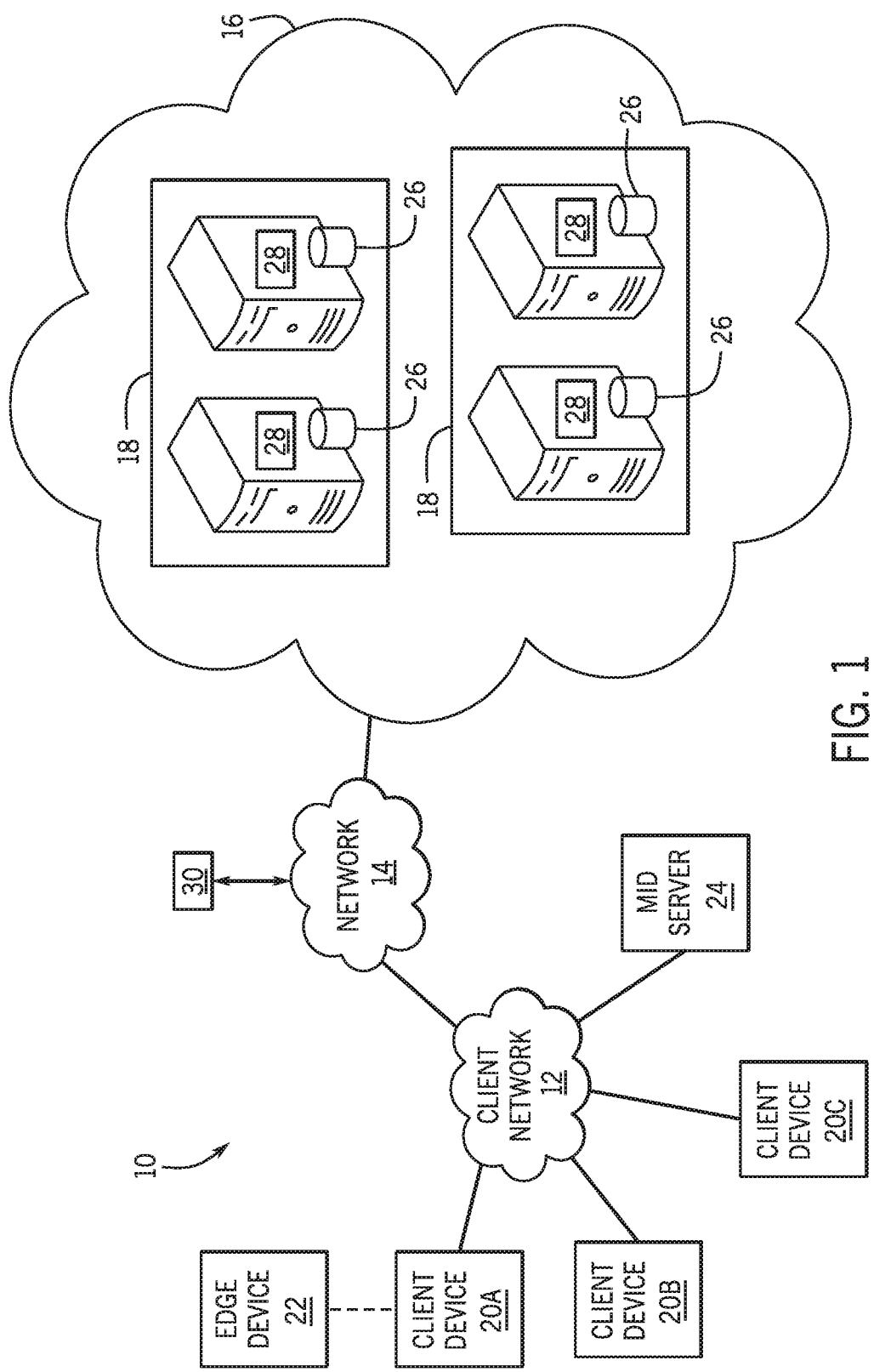
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device that includes, but is not limited to a computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "retry policy" may refer to computer instructions and/or systems that, upon receiving a condition, such as an error condition, reinitiate or otherwise resubmit certain inputs for processing. The retry policy may include one or more retry conditions and a retry strategy to follow based on the condition(s). For example, a retry policy may, upon receipt of a retry condition (e.g., connection error), resubmit certain authorization and/or connection information to reconnect with an external system. An "error condition" may refer to a runtime condition that would benefit from special handling, such as a connection timeout.

As used herein, the term "flow" may refer to data processing of information (e.g., database records) that may be presented to a user in a flow chart-like view. A flow may have inputs but may not have an output. A flow may include one or more "sub-flows" and/or one or more "Actions." The flow may also include "triggers" and control logic. A "sub-flow" as used herein may refer to data processing of information (e.g., database records) also presented to the user in a flow chart-like view. Unlike the flow, a sub-flow may have both inputs and outputs. A sub-flow may additionally contain Actions, triggers, control logic and/or other sub-flows. A "trigger" may be "fired" or turned on by a change in certain conditions, such as a change in one or more database records. The trigger may also be "fired" or otherwise turned on via a schedule, e.g., daily, weekly, monthly schedule. "Action" as used herein may include one or more "Steps." Steps may be self-contained code, such as scripts (e.g., Java, JavaScript code) provided by the manufacturer of the software tools used to create the flows, sub-flows, and the like. Steps may also be provided by users and any other entity. As used herein, the terms "flow objects" may refer to flows, sub-flows, Actions, and Steps.

Present embodiments are directed to providing for the creation, management, and/or subsequent use of retry handling policies in server environments, including cloned repositories. The retry handling policies described herein may enable a user (e.g., developer) to specify logic to determine when a retry should occur as well as logic to specify how the retry should occur. For example, certain conditions may result in a retry, such as a disconnection condition, and the retry may then be specified to occur at an interval or at an exponential backoff, as further described below. By providing for techniques to define retry handling policies, including visual techniques, the systems and methods described herein may enable more efficient development of a variety of automated processes.

With the preceding in mind, the following figures relate to various types of generalized system architectures or configurations that may be employed to provide services to an organization accessing a cloud-platform, such as may be embodied in a multi-instance or multi-tenant framework on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 in which embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to the network 14, which may include one or more computing networks, such as other LANs, wide area networks (WAN), the Internet, and/or other remote networks, in order to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to, a web server (e.g., a unitary Apache installation), an application server (e.g., unitary Java® Virtual Machine), and/or a database server, e.g., a unitary MySQL® catalog (MySQL® is a registered trademark owned by MySQL AB A COMPANY).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules.

It would be beneficial to include certain retry policies, including custom retry handling policies, in processes (e.g., automated processes) developed for the data centers 18 and/or the virtual servers 26. Accordingly, a retry handling policy system 28 may be provided, to be used to create certain objects suitable for implementing retry handling, including custom retry handling. For example, external systems 30, such as third-party systems, may include application programming interfaces (APIs) suitable for providing access to and processing via the external systems 30. For example, the external systems 30 may include representational state transfer (REST) APIs, simple object access protocol (SOAP) APIs, HTTP-based APIs, and the like, useful in interfacing with the external systems 30. The retry handling policy system 28 may provide, for example, for visual tools that enable a more efficient creation of retry policies when executing API calls in the external systems 30, as further described below.

Figure 2:
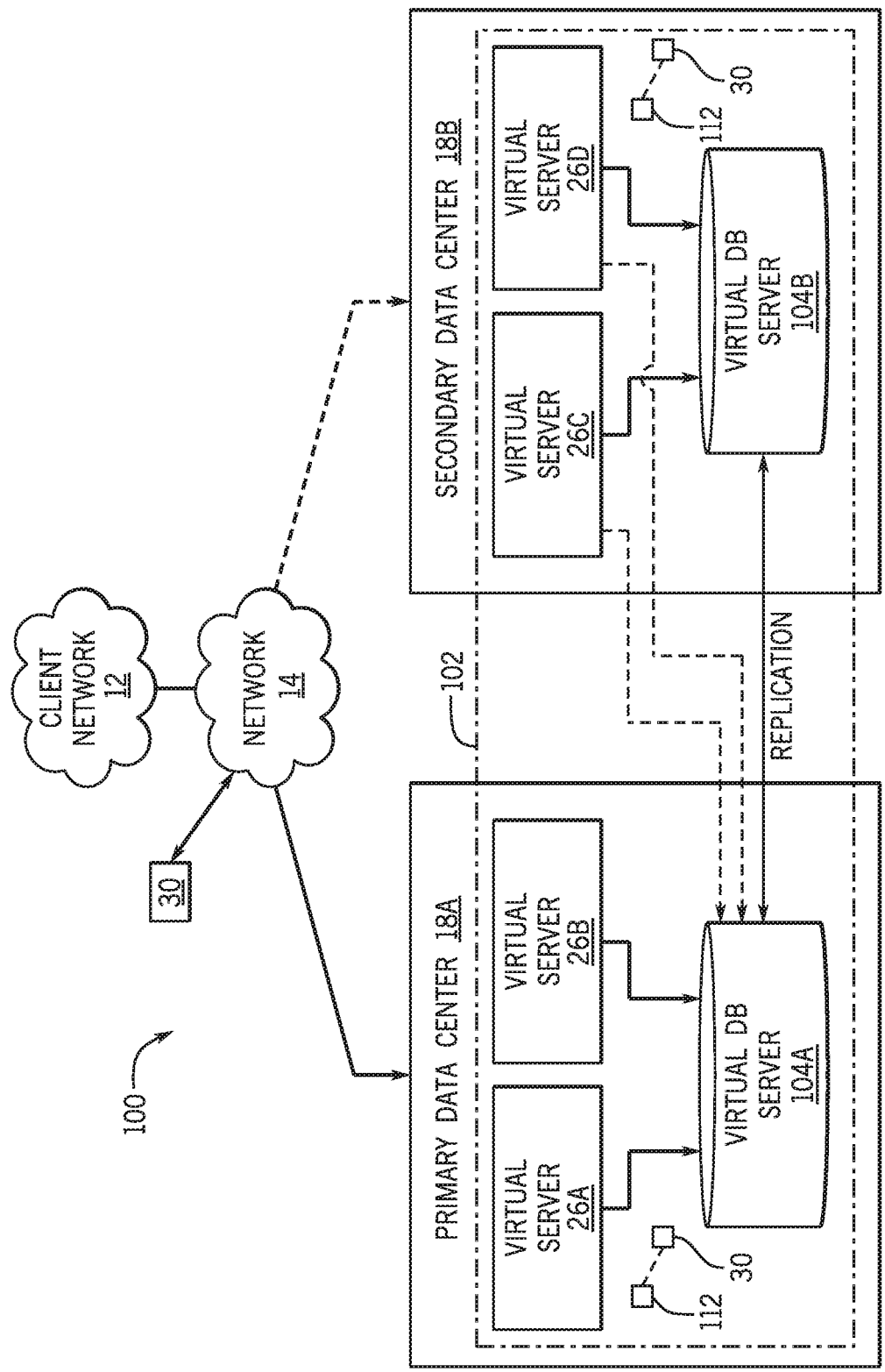
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server.

For example, the client instance 102 could be associated with (e.g., supported and enabled by) the dedicated virtual servers 26A-26D, dedicated virtual database servers 104A and 104B, and additional dedicated virtual web servers (not shown in FIG. 2).

In the depicted embodiment, the retry handling policy system 28 may provide for visual tools to create and implement retry handling, including custom retry handling. That is, the retry handling policy system 28 may enable flows created, for example by a Flow Designer system 112, to operatively couple with the external systems 30. The flows may then provide for retry handling of a variety of conditions that may occur during interfacing with the external systems 30. In the depicted example, the virtual servers 26 and/or the virtual database servers 104 include or are operatively coupled to the retry handling policy system 28 and to the Flow Designer system 112. Automation processes (e.g., flows) created by the Flow Designer system 112 as further described below may thus include retry handling policies created by the retry handling policy system 28. Additionally, the retry handling policy system 28 may be included in the Flow Designer system 112 and/or operatively coupled to the Flow Designer system 112. Further, software development activities, e.g., objects created via the Flow Designer system 112 may be created without resorting to typing in computer code.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server. Using FIG. 2 as an example, the virtual servers 26A, 26B, 26C, 26D and virtual database servers 104A, 104B may be combined into a single virtual server. The use and discussion of FIGS. 1 and 2 are only examples to facilitate ease of description and explanation of discrete or functional concepts and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
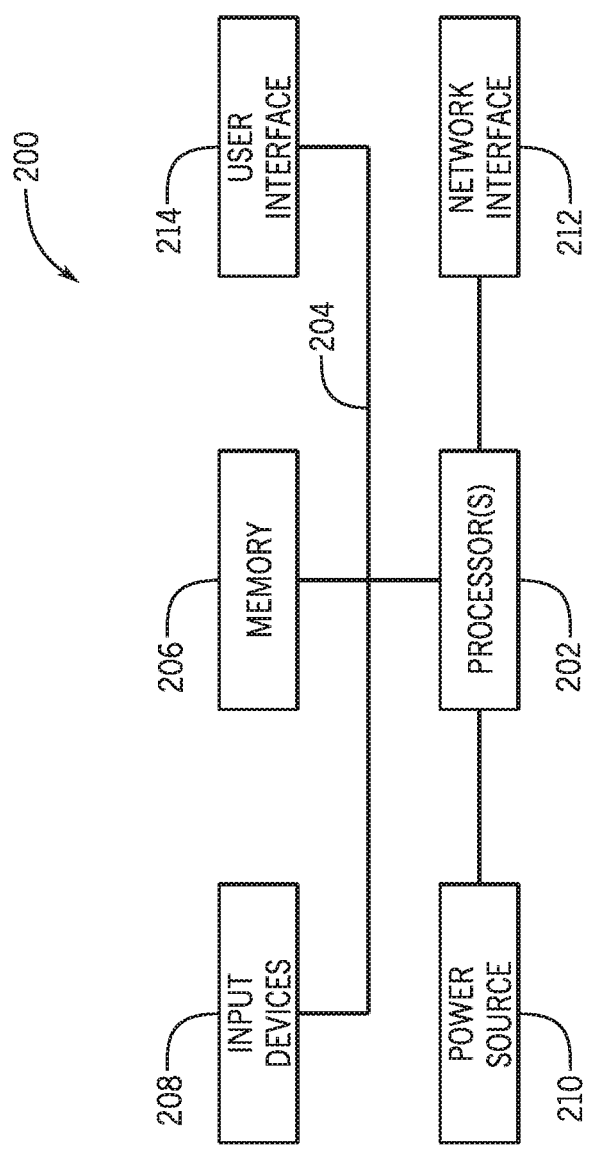
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 includes suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processor 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
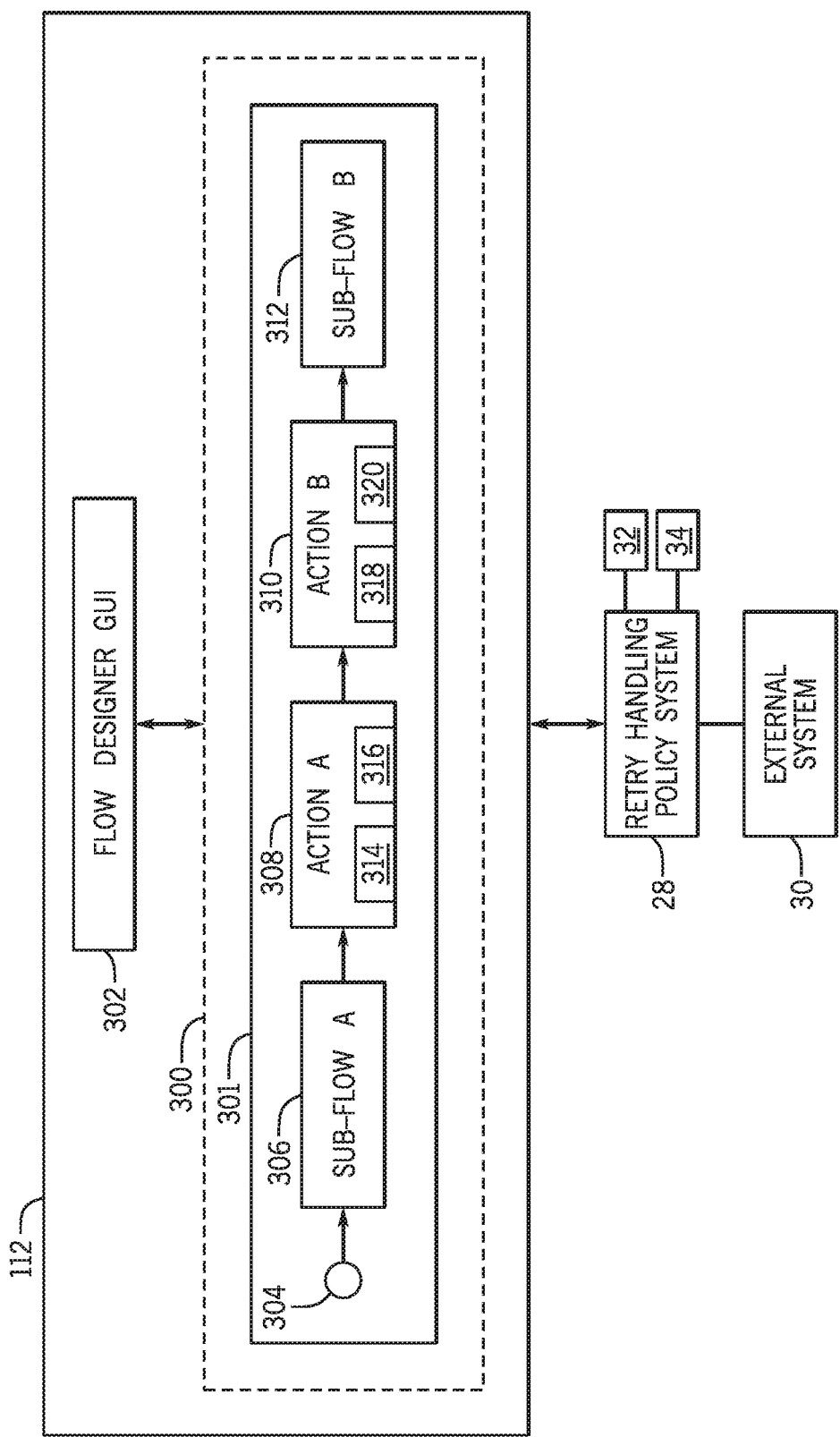
FIG. 4 is a block diagram illustrating a flow data processing system suitable for creating custom flow objects, in accordance with an embodiment.

It may be beneficial to describe certain computing resources that may be used in accordance with the techniques described herein. Turning now to FIG. 4, the figure is a block diagram illustrating an embodiment of the Flow Designer system 112 suitable for creating information flow objects 300 that may be used to design a flow for implementation of a cloud platform. In the depicted example, the retry handling policy system 28 may provide for the creation of retry handling policies, including custom policies, for certain objects created via the Flow Designer system 112. More specifically, the retry handling policy system 28 may create retry handling policies 32, 34 which may then be used by objects of the Flow Designer system 112 during execution of the objects.

It is to be understood that the Flow Designer system 112 as depicted is an example only and may be included in or implemented using one or more of the virtual servers 26, the virtual DB servers 104, or a combination thereof. In the depicted embodiment, the Flow Designer system 112 includes a flow designer GUI 302, e.g., a visual information flow creation tool. The flow designer GUI 302 may provide for visual programming via natural languages as opposed to entering text representative of a computer program. The flow designer GUI 302 may include executable code or computer instructions suitable for creating, managing, accessing, and/or editing the flow objects 300. In the depicted embodiment, a single flow 301 is shown in the flow objects 300. It is to be understood that more than one flow may be provided in the flow objects 300.

The flow 301 may include a trigger 304 which may be "fired" or otherwise turned on by certain changed condition, such as a change in one or more records stored in a database (e.g., stored in the virtual DB servers 104). The trigger 304 may additionally be "fired" periodically, for example, as part of a schedule (e.g., hourly schedule, daily schedule, weekly schedule, monthly schedule, and so on). The trigger 304 may thus be used to initiate execution of other flow objects 300, such as sub-flow 306, Action 308, Action 310, and sub-flow 312.

In the depicted embodiment, the trigger 304 initiates execution of the sub-flow 306. The sub-flow 306 may include Actions, control logic (e.g., Boolean logic, branching logic, termination logic), other sub-flows, and so on. The sub-flow 306 may additionally take in inputs and provide outputs. For example, output of the sub-flow 306 may be used as input to the Action 308. The Action 308 may use the inputs provided to execute Steps 314, 316. The Action 308 may also include control logic. Steps, such as the Steps 314, 316, and may be self-contained code, such as scripts (e.g., Java, JavaScript code) provided by the manufacturer of the flow designer system 112. As an example, the Flow Designer system 112 may be provided by ServiceNow™ Inc., of Santa Clara, Calif., U.S.A., under the name Flow Designer™. The Steps 314, 316 may be additionally or alternatively provided by other third parties and/or coded by certain users, such as IT users.

Steps may include any number of functionalities, such as requesting approval from other users of the servers 26, 104, creating records in a database table, editing the record in the database table, deleting the records in the database table, creating server tasks, logging messages, looking up database information, notifying of certain events (e.g., incidents, change requests, problems, changes to user records), executing scripts, such as JavaScript, sending email, waiting for a condition to occur, and so on. Action 310 may execute following Action 308. In turn, Action 310 may include Steps 318, 320, and upon completion of Step 320, sub-flow 312 may be executed. Once sub-flow 312 finishes execution, the flow 301 finishes. Flows, such as the flow 301, may not have outputs. The flows may be executable from external clients, such as a clients coupled to the client network 12 shown in FIG. 1.

The Actions 308, 310 may used the retry handling policies created via the retry handling policy system 28. That is, the Actions 308 and/or 310 may include retry logic that first processes a set of conditions during interactions with the external systems 30 to determine if a retry should occur. If the retry should occur the Actions 308 and/or 310 may then execute certain retry logic (e.g., retry strategy) to attempt further interactions with the external systems 30.

For example, objects developed by the Flow Designer system 112 may query a Box external system 30. The Box external system 30 may be provided by Box, Inc., of Redwood City, Calif., U.S.A, for example, to store and share online content (e.g., files). A call originating from a Flow Designer system's object may use the Box APIs to determine when users were last active. There may be hundreds or thousands of pages of data, and for each page, an API call may be executed to retrieve data contained in that page. A Subflow (or Action) object may handle the execution of the API calls to Box as part of a discovery job, and with each response, Box may return a "Next Page Token" indicating that more data is available. As the discovery job executes, on page 480 of 500, the Box API may return an HTTP 429— Too Many Requests. The techniques described herein may identify the condition (e.g., HTTP 429), and implement logic to retry receiving the data from Box, including implementing a retry interval, implementing an exponential backoff retry, and/or implementing a set-by-service retry, as further described below. By enabling retry handling policies for the objects (e.g., Flows, Subflows, Actions, Steps) of the Flow Designer system 112, the techniques described herein may provide for increased operational flexibility and error handling.

Figure 5:
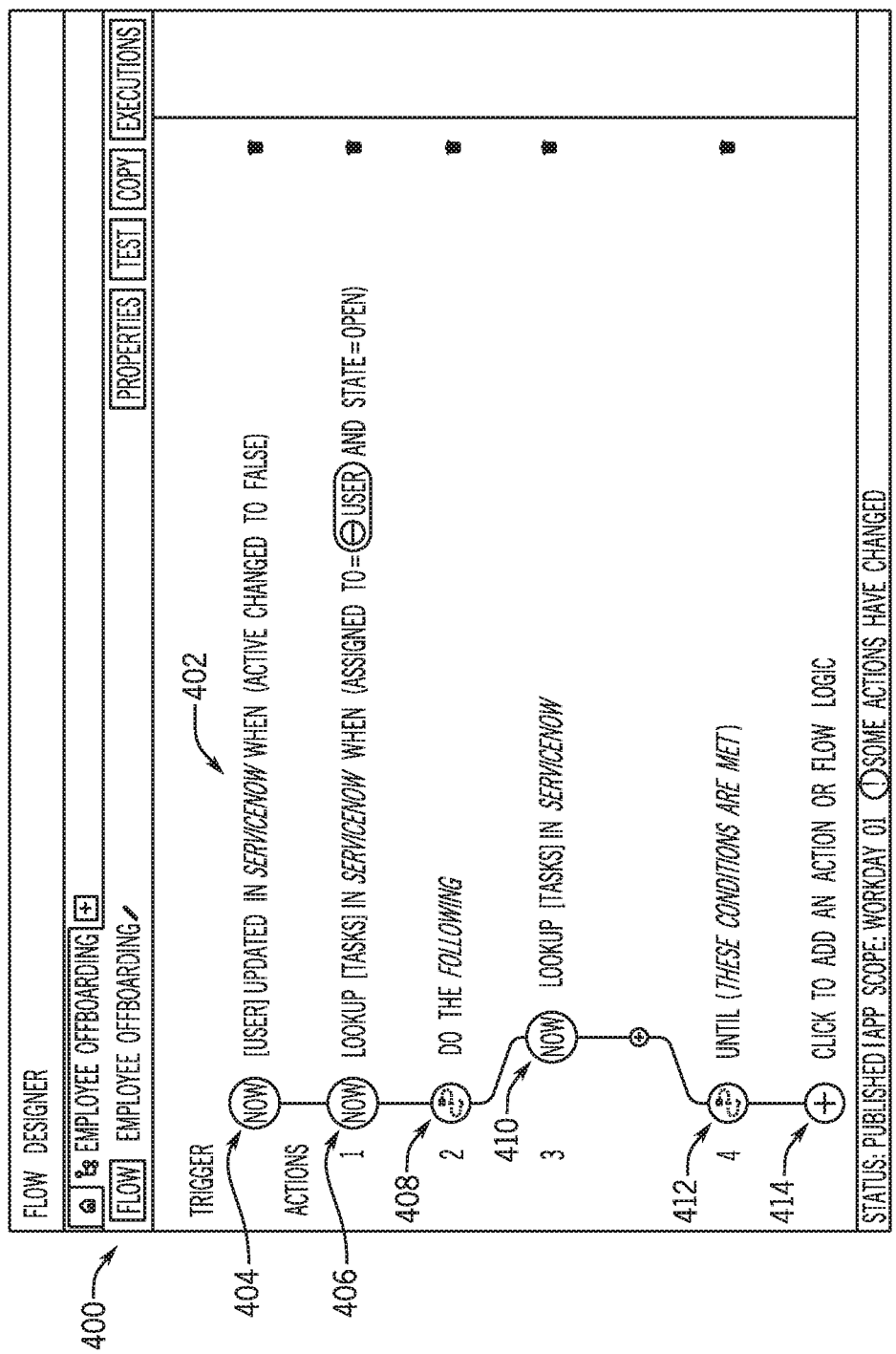
FIG. 5 is a screenshot of an embodiment of a graphical user interface (GUI) suitable for creating and/or editing flow objects, in accordance with an embodiment.

FIG. 5 is a screenshot depicting an embodiment of a graphical user interface (GUI) 400 suitable for inputting certain flow objects 300 into a flow, such as the flow 301. The GUI 400 may be accessible once the user 303 is authenticated via the authentication system 110 and used to create the flow 301 via the Flow Designer system 112. In the depicted embodiment, a graphical flow view 402 of a flow is shown. Indeed, the GUI 400 may be used to create and edit any number of graphical flow views that may then be executed as flow objects 300.

In the depicted embodiment, the graphical flow view 402 may start execution via a trigger 404. More specifically, if a certain user record is updated, then the trigger 404 may "fire" and execute Action 406. The Action 406 may then retrieve a set of tasks assigned to the updated user that have an open state. The retrieved tasks may then be further process via a "Do . . . Until" control logic. More specifically, a Do logic 408 may execute one or more Actions, such as Action 410, until the "Until" control logic 410 has its conditions met. More sub-flows and/or Actions may be added, for example, via the "+" control 414. As shown, natural language and visual composition via the flow designer 302 may be used to enable the creation of executable flow objects 300. The flow objects 300 may then be reused by clients connected to the network 12.

Figure 6:
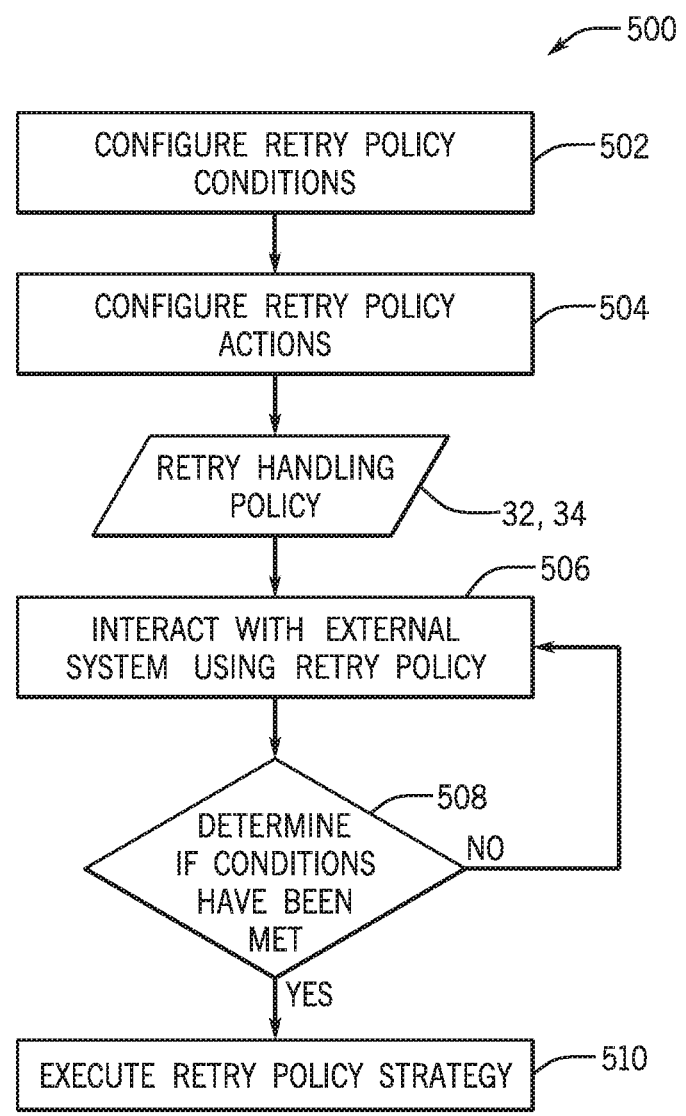
FIG. 6 is a flow chart illustrating an embodiment of a process suitable for creating and executing retry policies, in accordance with an embodiment.

Turning now to FIG. 6, the figure is a flow chart of an embodiment of a process 500 suitable for implement the techniques described herein, including creating and executing retry policies 32, 34. The process 500 may be implemented as computer code or instructions executable by the one or more processors 202 and stored in the memory 206. In the depicted embodiment, the process 500 may configure (block 502) retry policy conditions. That is, the process 500 may enable a user to enter information suitable for describing certain conditions that may arise during the interactions between objects (e.g., Flows, Subflows, Actions, Steps) created by the Flow Designer system 112 and the external systems 30. In certain embodiments, the policy conditions may include connection conditions, e.g., connections with the external systems 30, and/or transactional conditions, such as errors during the retrieval or exchange of data. Runtime errors may be configured (block 502), as well as security errors (e.g., incorrect credentials), configuration-based errors (e.g., wrong URL), service system failure, server failure, and so on.

The process 500 may also provide for configuration (block 504) of retry policy actions. That is, once a condition has been found, certain actions may then be taken. For example, a connection drop condition may result in an action that includes a reconnection retry. The reconnection retry may be configured (block 504) to occur in at a specified retry interval (e.g., every millisecond, 10 milliseconds, 100 milliseconds, every one second, and so on), at an exponential backoff (e.g., at an interval that changes for subsequent retries, such as an exponential change from the previous interval), and/or a set-by-service retry (e.g., interval specified by a service or a service provider). The resultant, configured retry policies 32, 34 may thus include customizations suitable for improving interactions with the external systems 30. By providing for configuration of retry policy conditions and subsequent actions (e.g., retry strategy actions), the techniques described herein may enable a more flexible approach to error handling.

The retry policies 32, 34 may then be used during interactions (block 506) with the external systems 30. For example, REST APIs, SOAP APIs, and so on, may be executed by Flow Designer system 112 objects (e.g., Flows, Subflows, Actions, Steps) to interact with the external systems 30. During the interactions, the process 500 may determine (decision 508) that the conditions detailed in retry policies, such as retry policy 32 and/or 34 have been met. For example, a connection error, a data transfer error, a configuration error, and so on, may be detected, and based on the configuration present in the retry policy 32 and/or 34, the process 500 may decide that the retry policy condition has been met. If the retry policy condition has been met, the process 500 may then execute (block 510) the retry policy's strategy (e.g., actions to take based on the conditions found). For example, certain reconnections to the external systems 30 may be executed using timed intervals, exponential backoff intervals, and/or set-by-service intervals. The retry strategy may include resubmitting data (e.g., connection data, transactional data, and so on), based on the configuration provided in block 504.

Figure 7:
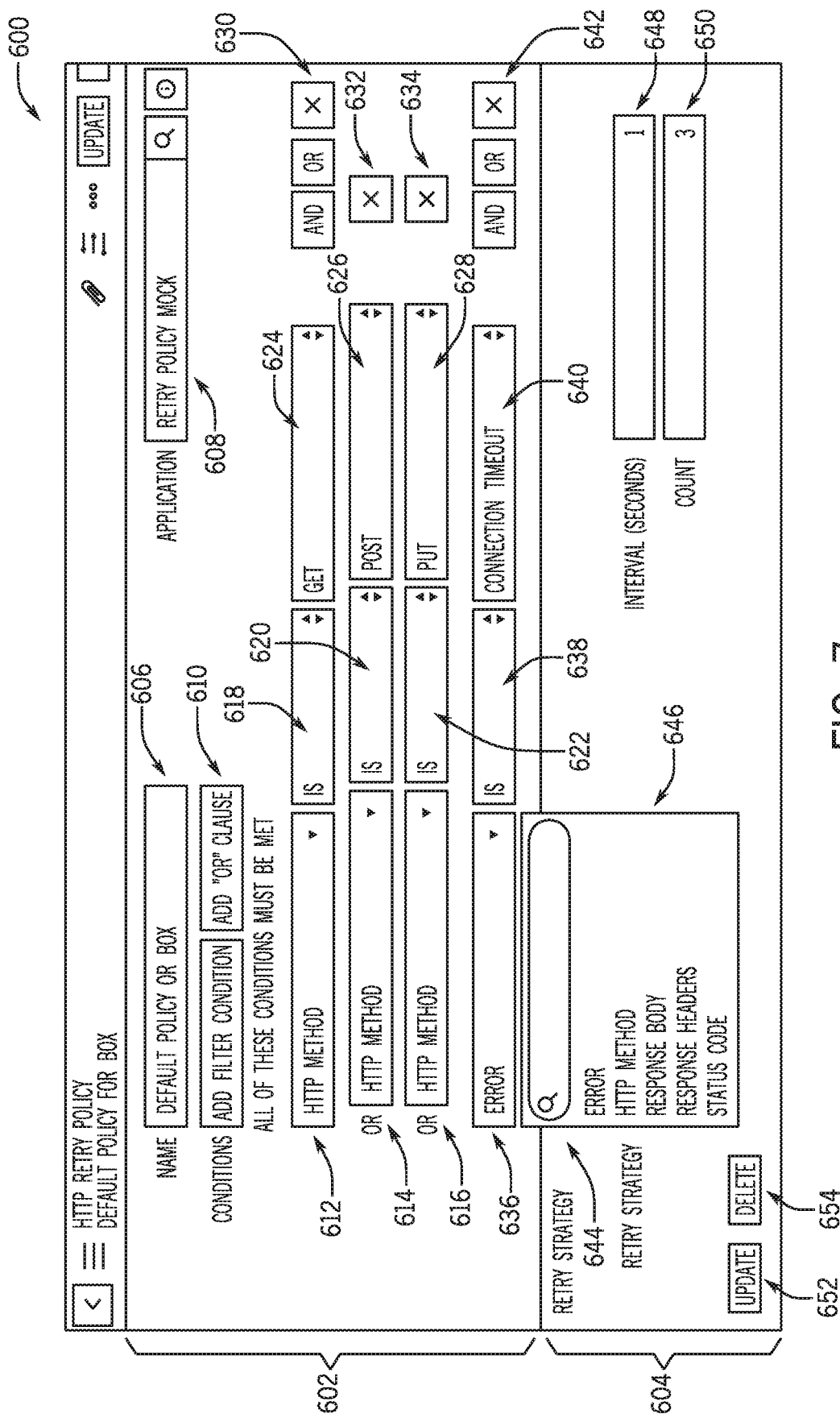
FIG. 7 is a is screenshot of an embodiment of a GUI having multiple visual controls suitable for entering both retry policy condition information and retry policy strategies without typing code, in accordance with an embodiment.

Turning now to FIG. 7, the figure is screenshot of an embodiment of a GUI 600 having multiple controls suitable for entering both retry policy condition information and retry policy strategies. More specifically, section 602 of the GUI 600 may be used to enter retry policy conditions, while section 604 of the GUI 600 may be used to enter retry policy strategy. In the depicted embodiment, control 606 may be used to enter a name for the retry policy, while control 608 may be used to enter an application name. It is to be noted that the GUI 600 may be include in the retry policy handling system 28, the Flow Designer system 112, or a combination thereof.

Condition controls 610 provide for entering filter condition and logic. For example, three hypertext transfer protocol (HTTP) Method conditions are shown, including a GET condition 612, a POST condition 614, and a PUT condition 616. More specifically, controls 618, 620, and 622 may be activated (e.g., showing "is") to define that the HTTP Method is a GET, POST, and PUT. That is, controls 624, 626, and 628 may be used to select the desired HTTP Method. Controls 630, 632, and 634 may then be used to provide for conditional logic (e.g., AND, OR logic) for the GET condition 612, the POST condition 614, and the PUT condition 616, respectively.

Error conditions are also shown. More specifically, an error condition 636 is shown, that includes a connection timeout. As mentioned earlier, a control 638 may be activated to define that the error condition 636 "is" a connection timeout. A control 640 is shown as activated to define that the "is" refers to a connection timeout. Other conditions that may be configured in the depicted embodiment include Response Body conditions, Response Header conditions, and Status code conditions, as illustrated in a dropdown list 644. As shown, the section 602 provides for visual controls that may be used without typing code. That is, dropdowns, lists, buttons, and so on, may be used to define retry policy conditions, such as the conditions in the retry policies 32, 34 instead of typing code to handle the conditions.

Figure 8:
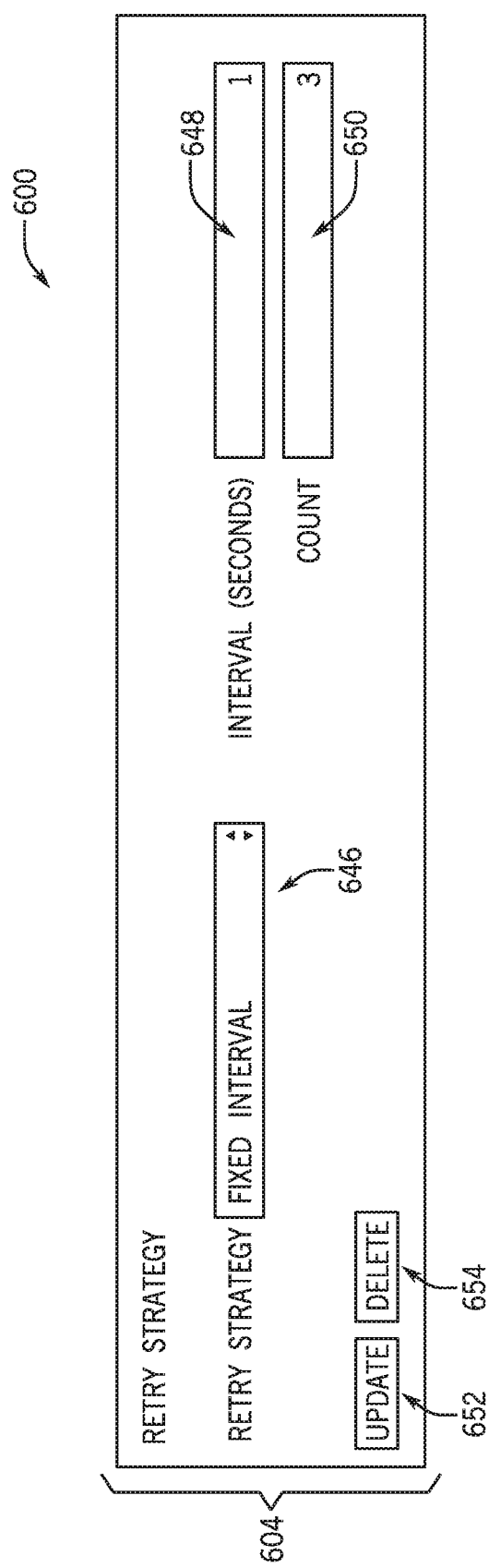
FIG. 8 is screenshot depicting an embodiment of a retry strategy section of the GUI of FIG. 7, in accordance with an embodiment.

Section 604 may be used to configure a retry strategy once the conditions have been met, as further described in FIG. 8. More specifically, FIG. 8 is a screenshot depicting an embodiment of the section 604 of the GUI 600 as well as update button 652 and delete button 654. The retry policy defined via the GUI 600 may include a retry strategy that retries at a fixed interval as shown in control 646, but also may retry at exponential backoff intervals, and/or at set-by-service intervals. The control 648 may be used to specify a time, such as an interval time in seconds, while the control 650 may be used to specify a desired maximum retry count. As noted above, once the condition(s) specified in section 602 are met, section 604 may then execute the desired retry strategy. The update control 652 may update an existing retry policy while the delete control 654 may delete an existing retry policy. By providing for visual controls that do not use typed computer code, such as the controls in section 604, the techniques described herein may enable a more flexible and efficient development of retry policies, such as the policies 32, 34.

Figure 9:
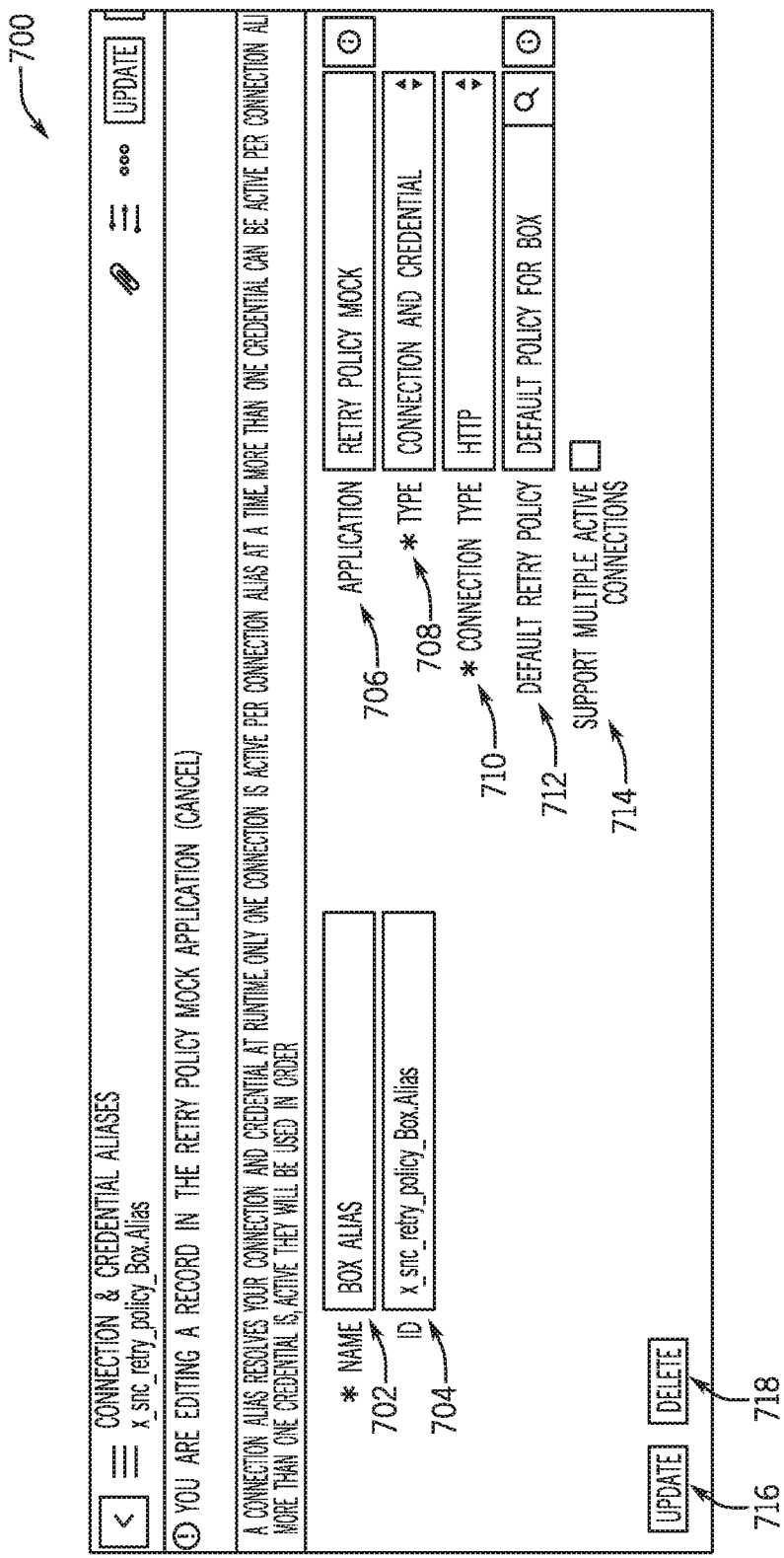
FIG. 9 is a screenshot depicting an embodiment of a GUI suitable for entering connection and credential information to connect, for example, to external systems, and to use retry policies, in accordance with an embodiment.

FIG. 9 is a screenshot depicting an embodiment of a graphical user interface (GUI) 700 suitable for entering connection and credential information to connect, for example, to the external systems 30 (e.g., Box system). It is to be noted that the GUI 700 may include in the retry policy handling system 28, the Flow Designer system 112, or a combination thereof. Further, the GUI 700 may provide for the selection of a retry policy to use when interacting with the external systems 30. In the depicted embodiment, a user may enter a connection and credential alias name in a control 702. A unique identification for the connection and credential alias may then be displayed in a control 704. The connection and credential alias may be associated with an application (e.g., server 26 and/or 104 application, such as a Flow Designer system 112 application) via a control 706. A type for the alias, e.g., connection and credential type, may be selected via a control 708.

Advantageously, the GUI 700 may link a previously created retry policy, e.g., policy 32, 34, with the connection and credential alias to be used during, for example, during interactions with the external systems 30. Accordingly, a control 712 may be used to select a retry policy, such as a retry policy created via the GUI 600 shown previously. The selected retry policy may then be used, for example, during connection and/or credentialing activities to determine if certain conditions are present that would benefit from retry strategies. Also shown is a control 714 that may be used for enabling support for multiple active connections, and controls 716 and 718 for updating and for deleting the connection and credential alias, respectively. Once the connection and credential alias has been created, the connection and credential alias may be used by an object of the Flow Designer system 112, as shown in FIG. 10.

Figure 10:
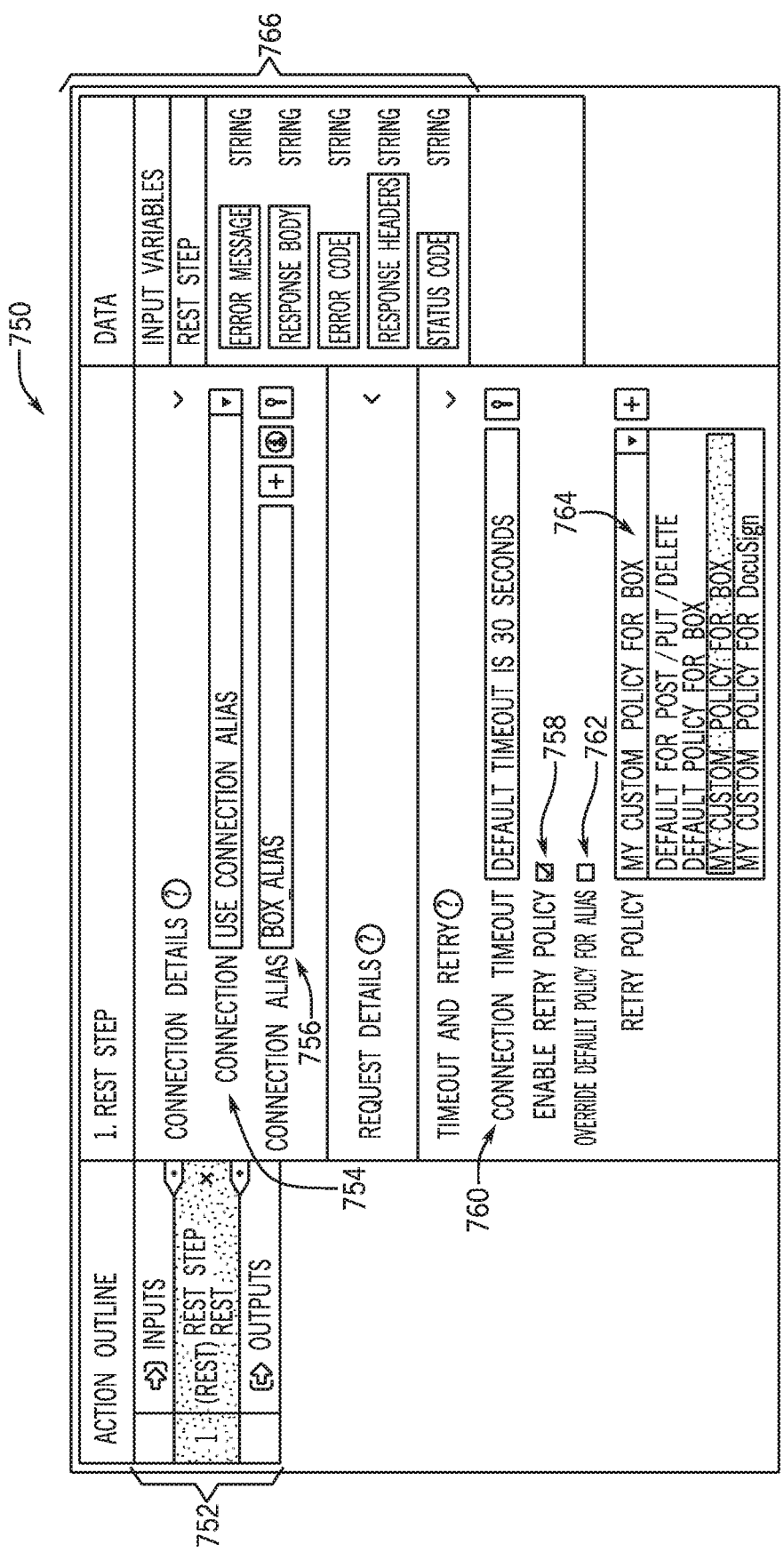
FIG. 10 is a screenshot of an embodiment of a GUI that may be used to add connection and credential aliases, including retry policies, to certain objects of the flow processing system of FIG. 4, in accordance with an embodiment.

FIG. 10 is a screenshot of an embodiment of a GUI 750 that may be used to add connection and credential aliases, including retry policies, to certain objects of the Flow Designer system 112. It is to be noted that the GUI 750 may be include in the retry policy handling system 28, the Flow Designer system 112, or a combination thereof. As shown, the GUI 750 includes a section 752 that may be used to provide a flow outline, e.g., Action outline, which includes certain objects, e.g., REST Steps, SOAP Steps, using the connection and credential alias to connect with the external systems 30. A connection control 754 may be used to enter a connection type, e.g., connection alias, while a connection alias name control 756 may be used to enter a connection alias name, such as the name of a connection and credential alias entered via the GUI 700 shown in FIG. 9.

The user may activate a control 758 to enable the default retry policy which may be included in the connection and credential alias. If the user wishes to override the default retry policy, the user may then activate a control 762, and then select a retry policy to use via a control 764. Section 766 may provide for further details for the REST Step shown in section 752, including error messages, response body details, error codes, response header details, and/or status codes.

Figure 11:
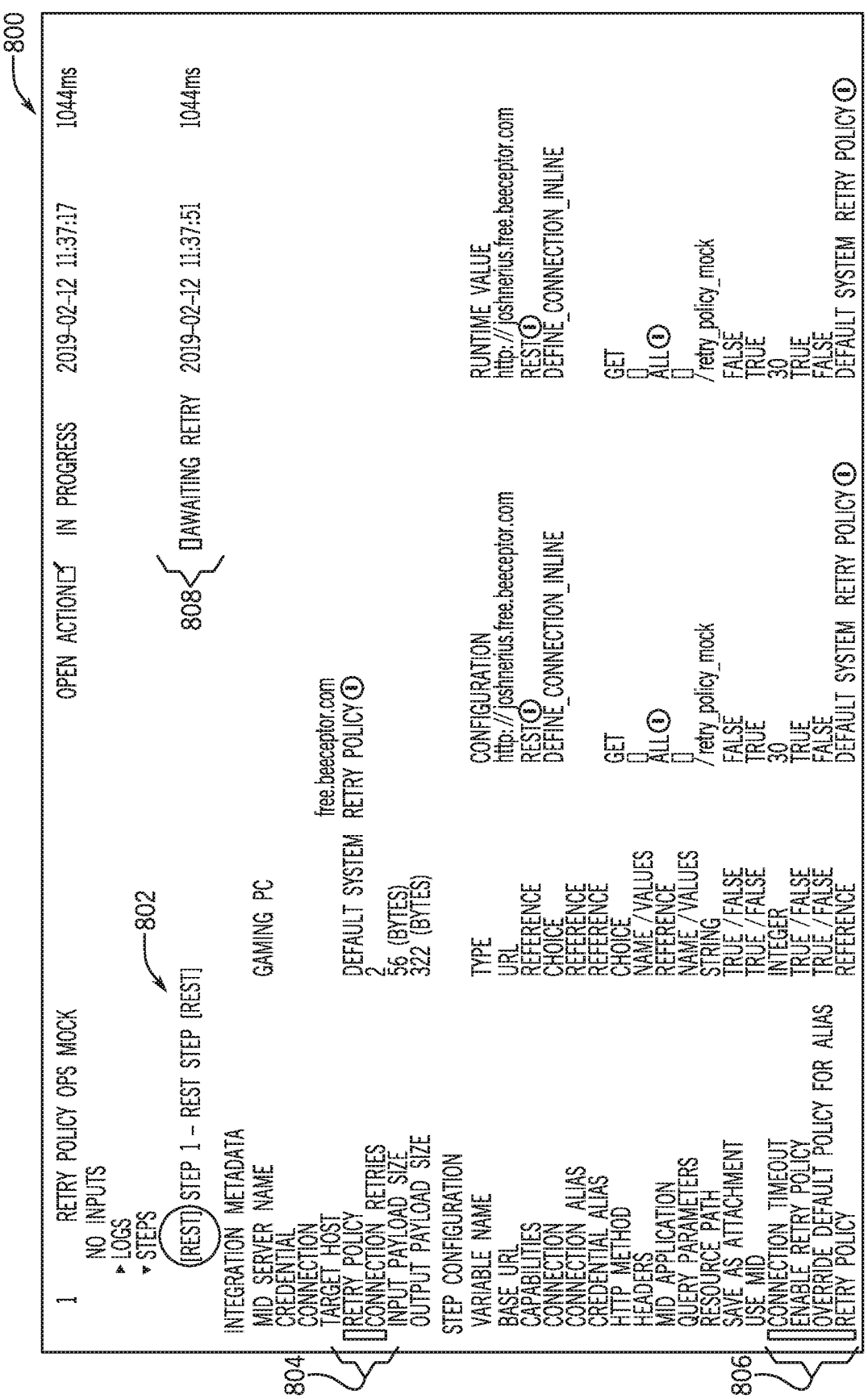
FIG. 11 is a screenshot of an embodiment of a GUI that may be used during operations of the servers of FIG. 1 to view certain objects as they execute, in accordance with an embodiment.

FIG. 11 is a screenshot of an embodiment of a GUI 800 that may be used during operations of the servers 26, 104 to view certain objects as they execute. It is to be noted that the GUI 800 may be include in the retry policy handling system 28, the Flow Designer system 112, or a combination thereof. In the depicted embodiment, a Step 802, such as the Step shown in section 752 of FIG. 10, is shown along with operational data (e.g., real-time data, live data) for the Step 802. For example, section 804 shows that the Step 802 is using a retry policy created via the GUI 600. The retry policy is shown as having executed two connection retries. The section 806 includes details for the retry policy under operation, including connection timeout values, that the retry policy is enabled, and that the retry policy is the default policy. The embodiment also shows, in section 808, that there is a retry awaiting. By providing for visual tools suitable for entering and using retry policies, the techniques described herein may result in more flexible automated process and information flows.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
a server comprising one or more processors and memory storing instructions, wherein the server is communicatively coupled to a data repository and configured to store a data in the data repository, wherein the instructions, when executed by the one or more processors, are configured to cause the one or more processors to perform operations comprising:
creating, in response to inputs received via a visual information flow creation tool, at least one information flow object;
providing, via a retry policy handling system, a default retry policy;
creating, in response to inputs received via the retry handling policy system, a custom retry policy, wherein the custom retry policy comprises a retry condition and retry strategy; and
enabling the at least one information flow object to follow the retry strategy of the custom retry policy when the retry condition occurs based on a selection of a connection alias, wherein the retry strategy comprises a backoff having a retry interval that changes exponentially from a previous retry interval, wherein the connection alias implements the custom retry policy that comprises the retry strategy and wherein the connection alias is used to interface between the server and an external system via a service provider without relying on a set-by-service retry strategy set by the service provider.

2. The computing system of claim 1, wherein creating, via the visual information flow creation tool, the at least one information flow object comprises creating the at least one information flow object in lieu of entering text for a computer program.

3. The computing system of claim 1, wherein creating, via the retry handling policy system, the custom retry policy, comprises providing for visual controls configured to create the retry condition without typing computer code.

4. The computing system of claim 3, wherein the visual controls comprise a first control configured to list a plurality of retry conditions comprising an error, a hypertext transfer protocol (HTTP) Method, a Response Body, a Response Header, a Status code, or a combination thereof, and a second control configured to provide for an "AND" logic, an "OR" logic, or a combination thereof, to apply to the at least one of the plurality of retry conditions, wherein inputs entered into the first control and into the second control are used as Boolean logic to trigger the retry interval.

5. The computing system of claim 1, wherein creating, via the retry handling policy system, the custom retry policy, comprises providing for visual controls configured to create the retry strategy without typing computer code.

6. The computing system of claim 1, wherein the connection alias comprises a connection information to connect with a third-party system, wherein the connection alias includes the custom retry policy.

7. The computing system of claim 1, wherein the operations further comprise:
creating, in response to inputs received via the visual information flow creation tool, a second information flow object, wherein the at least one information flow object and the second information flow object are part of a same visual program;
creating, in response to inputs received via the retry handling policy system, a second custom retry policy, wherein the second custom retry policy comprises a second retry strategy and a second retry condition different from the retry condition; and
enabling the second information flow object to follow the retry strategy of the second custom policy when the second retry condition occurs.

8. The computing system of claim 1, wherein the server is configured to perform operations comprising displaying, during operations of the at least one information flow object, a first section detailing the custom retry policy and a number of connection retries, a second section detailing awaiting retries, a third section detailing information for the custom retry policy, or a combination thereof.

9. The computing system of claim 1, wherein the at least one information flow object comprises a Flow Designer Flow, Subflow, Action, Step, or combination thereof.

10. The computing system of claim 1, wherein the operations comprise receiving, in a specification associated with the connection alias, an override default policy indication that the custom retry policy is to be overridden by another retry policy.

11. A method, comprising:
creating, via a visual information flow creation tool, at least one information flow object;
providing, via a retry policy handling system, a default retry policy;
creating, via the retry handling policy system, a custom retry policy, wherein the custom retry policy comprises a retry condition and a retry strategy; and
enabling the at least one information flow object to follow the retry strategy of the custom retry policy when the retry condition occurs based on a user selecting a connection alias, wherein the retry strategy is configured as part of the connection alias used to interface with an external system via a service provider rather than being set by the service provider, and wherein the retry strategy comprises a backoff having a retry interval that changes exponentially from a previous retry interval.

12. The method of claim 11, wherein creating, via the retry handling policy system, the custom retry policy, comprises providing for visual controls configured to create the retry condition without typing computer code.

13. The method of claim 12, wherein the visual controls comprise a first control configured to list a plurality of retry conditions comprising an error, a hypertext transfer protocol (HTTP) Method, a Response Body, a Response Header, a Status code, or a combination thereof, and a second control configured to provide for an "AND" logic, an "OR" logic, or a combination thereof, to apply to the at least one of the plurality of retry conditions, wherein inputs entered into the first control and into the second control are used as Boolean logic to trigger the retry interval.

14. The method of claim 11, wherein creating, via the retry handling policy system, the custom retry policy, comprises providing for visual controls configured to create the retry strategy without typing computer code.

15. The method of claim 14, comprising displaying, during operations of the at least one information flow object, a first section detailing the custom retry policy and a number of connection retries, a second section detailing awaiting retries, a third section detailing information for the custom retry policy, or a combination thereof.

16. A non-transitory, computer-readable medium storing instructions executable by a processor of a computing system, the instructions configured to:
create, in response to inputs received via a visual information flow creation tool, at least one information flow object;
provide, via a retry policy handling system, a default retry policy;
create, in response to inputs received via the retry handling policy system, a custom retry policy, wherein the custom retry policy comprises a retry condition and a retry strategy; and
enable the at least one information flow object to follow the retry strategy of the custom retry policy when the retry condition occurs based on a user selecting a connection alias, wherein the retry strategy of the custom retry policy is configured as part of the connection alias used to interface with an external system via a service provider rather than being set by the service provider, and wherein the retry strategy comprises a backoff having a retry interval that changes exponentially from a previous retry interval.

17. The computer-readable medium of claim 16, wherein the instructions configured to create, via the retry handling policy system, the custom retry policy, comprise instructions configured to display visual controls configured to create the retry condition without typing computer code.

18. The computer-readable medium of claim 17, wherein the visual controls comprise a first control configured to list a plurality of retry conditions comprising an error, a hypertext transfer protocol (HTTP) Method, a Response Body, a Response Header, a Status code, or a combination thereof, and a second control configured to provide for an "AND" logic, an "OR" logic, or a combination thereof, to apply to the at least one of the plurality of retry conditions, wherein inputs entered into the first control and into the second control are used as Boolean logic to trigger the retry interval.

19. The computer-readable medium of claim 16, wherein the instructions configured to create, via the retry handling policy system, the custom retry policy, comprise instructions configured to display visual controls configured to create the retry strategy without typing computer code.

20. The computer-readable medium of claim 19, comprising instructions configured to display, during operations of the at least one information flow object, a first section detailing the custom retry policy and a number of connection retries, a second section detailing awaiting retries, a third section detailing information for the custom retry policy, or a combination thereof.

* * * * *